(12) United States Patent
Melman et al.

(10) Patent No.: US 6,229,934 B1
(45) Date of Patent: May 8, 2001

(54) HIGH-SPEED LOW-LOSS FIBER-OPTIC SWITCHES

(75) Inventors: Paul Melman, Newton; Yingyin Zou, Burlington; Hua Jiang, Mansfield; Feiling Wang, Medford; Jing Zhao, Winchester, all of MA (US)

(73) Assignee: NZ Applied Technologies Corporation, Woburn, MA (US)

( * ) Notice: Subject to any disclaimer, the term of this patent is extended or adjusted under 35 U.S.C. 154(b) by 0 days.

(21) Appl. No.: 09/158,000

(22) Filed: Sep. 22, 1998

Related U.S. Application Data

(60) Provisional application No. 60/059,476, filed on Sep. 22, 1997.

(51) Int. Cl.[7] .................................................. G02B 6/26
(52) U.S. Cl. ................................. 385/18; 385/8; 385/16; 385/20; 359/247
(58) Field of Search ............................... 385/2, 8, 11, 16, 385/17, 18, 20, 21, 24, 40, 45; 359/483, 485, 245, 247, 250, 254, 259, 128; 349/196

(56) References Cited

U.S. PATENT DOCUMENTS

| | | | |
|---|---|---|---|
| 4,461,543 | 7/1984 | McMahon | 385/17 |
| 4,474,435 | 10/1984 | Carlsen et al. | 385/16 |
| 4,478,494 | 10/1984 | Soref | 385/2 |
| 4,504,121 | 3/1985 | Carlsen et al. | 385/3 |
| 4,516,837 * | 5/1985 | Soref et al | 385/16 |
| 4,636,786 | 1/1987 | Haertling | 359/254 |
| 4,746,191 | 5/1988 | Kawakami et al. | 385/16 |
| 4,919,522 | 4/1990 | Nelson | 359/246 |
| 4,991,924 | 2/1991 | Shanker et al. | 385/16 |
| 5,050,954 | 9/1991 | Gardner et al. | 385/16 |
| 5,090,824 | 2/1992 | Nelson et al. | 385/22 |
| 5,276,747 | 1/1994 | Pan | 385/34 |
| 5,305,136 | 4/1994 | Smith | 359/247 |
| 5,321,774 * | 6/1994 | Barnard et al. | 385/16 |
| 5,414,541 | 5/1995 | Patel et al. | 349/196 |
| 5,477,350 | 12/1995 | Riza et al. | 349/24 |
| 5,703,973 | 12/1997 | Mettler et al. | 385/14 |
| 5,706,371 | 1/1998 | Pan | 385/11 |
| 5,724,165 | 3/1998 | Wu | 359/117 |
| 5,734,763 | 3/1998 | Chang et al. | 385/11 |

OTHER PUBLICATIONS

Higashino et al., "High Speed Optical TIR Switched Using PLZT Thin Film Waveguides on Sapphire," Japanese Journal of Applied Physics, vol. 24 (1985) Supplement 24–2, pp. 284–286.

K Iizuka, Engineering Optics, Springer–Verlag, New York (1985), pp. 429–433.

* cited by examiner

Primary Examiner—Hemang Sanghavi
(74) Attorney, Agent, or Firm—Hamilton, Brook, Smith & Reynolds, P.C.

(57) ABSTRACT

The invention provides a fiber-optic 2×2 switch using a dual-fiber 50:50 input coupler and a dual-fiber 50:50 output coupler. One fiber from each coupler makes contact to an inner transparent electrode on a planar layer of electro-optic material and the other fibers make contact to an outer transparent electrode on the layer. The electro-optic layer has its other side coated with a transparent electrode which is placed in optical contact with one end of a GRIN lens. The fibers are arranged so that the inner fibers are at conjugate points and the outer fibers also at conjugate points of the lens. The other end of the lens is coated with a mirror. Applying a voltage between either the inner or outer electrode changes the optical path length for the light from and to the fibers traveling through the material under the selected electrode causing the light from the two input fibers to be switched between the two output fibers. 2×N switches can be constructed by concatenating 2×2 switches. The switch can also be used as a modulator. A convenient fiber alignment method is described.

33 Claims, 5 Drawing Sheets

100 # HIGH-SPEED LOW-LOSS FIBER-OPTIC SWITCHES

CROSS REFERENCE TO RELATED APPLICATIONS

This application claims priority from a provisional application No. 60/059,476, filed Sep. 22, 1997.

BACKGROUND

1. Technical Field

The present invention relates to optical switches for use with fiber-optic cable waveguides. In particular, it provides a non-mechanical electro-optic 2×2 crossbar-type switch which can be expanded to a 2×N or 1×N switch.

2. Background

Communication using guided light waves has become increasingly practical as fiber-optic cables have improved. For use with 1.5 μm and shorter wavelengths, these are constructed from silica glass as a small diameter, 5–100 μm core, surrounded by a higher index of refraction cladding layer. The cable acts as a circular waveguide. If the core is as small as a few wavelengths, e.g., 8–10 μm, only one mode of light can be transmitted. These means that all the light will be in phase and travel coherently for long distances. Currently, single mode fibers are commercially available capable of transmitting 1.3 μm and 1.5 μm wavelength light with losses below 0.5 db/km. The glass part of these cables is only 125 μm in diameter so that many fibers can fit in a small space.

In addition to fiber-optic cables, a number of other components are required for optical communications systems. These include laser diode light sources, photodetectors, permanent or temporary fiber joining devices (splices and couplers), amplitude modulators, optical isolators, and switches. Many of these components have acceptable performance characteristics, but available switches are not satisfactory for many applications.

One class of switches uses fibers which are cut precisely and held in fixtures. Switching is accomplished by butting the end of a selected fiber to another using solenoids, motors and the like. A number of ingenious mechanisms have been developed which can maintain close tolerances on the positioning of fibers. Fiber-to-fiber losses as low as 0.1 db can be achieved even for switches with a large number of incoming and outgoing fibers. Other approaches involve moving mirrors. However, being mechanical devices, the speed at which switching can be accomplished is in the 10–100 millisecond range. Another type of switch uses liquid crystals which can switch no faster than about 100 microseconds. They are generally designed to handle a small number, e.g., two input fibers and two output fibers, but if the losses are low enough this is an acceptable approach. The telephone industry has long used the 2×2 crossbar switch to build more complicated switching configurations. In this switch, each of two inputs are connected to two outputs, physically directly across from the inputs (the bar state), or the connections are crossed over (the cross state).

A very high speed crossbar switch with nanosecond switching speed can be constructed on a lithium niobate substrate. In this type, the fibers are coupled to quasi-rectangular thin film titanium waveguides diffused into the lithium niobate. These are arranged to be within a few micrometers of each other. Ordinarily, the light from the two waveguides does not interact and travels straight through. However, if an electric field is applied to the lithium niobate, its index of refraction will change and a condition can be set up where the light in each of the two waveguides crosses over to the other. The major drawback of the lithium niobate switch is that the losses are fairly high. It is difficult to couple light from the round fiber core waveguide into the rectangular waveguide on the substrate. In addition, this switch only works for singly polarized light.

A major problem faced in manufacturing fiber-optic components is alignment of fibers. When two fibers are to be mated to each other, precision mounting hardware is often adequate. However, when there are intervening optical elements with even slightly distorted optical paths, optical alignment requires injecting light in one fiber and moving the second and possibly additional fibers until maximum transmission is achieved. At this point the fibers are secured with UV-curing adhesives. This is tedious because, for 10 μm-core single-mode fibers, the alignment must be withing 1 μm radially and 1° in angle for the insertion loss to be less than 0.1 db. A faster alignment method would greatly reduce the cost of packaging these devices.

SUMMARY OF THE INVENTION

Accordingly, an object of the invention is to provide a 2×2 optical switches or modulators that can operate at high speed and yet have low losses at reasonable cost. Another object of the invention is to use a basic 2×2 switch to build 2×N switches. Lastly, another object is to provide an alignment jig and method which reduces the packaging cost and improves the accuracy.

The 2×2 switch is constructed by providing a) a combination collimating lens and reflector selected to collimate light entering from fiber-optic cables at an input end and refocus it on fiber optic cables located at conjugate points at the input end: b) a voltage-controlled electro-optic phase retarder in optical contact with the input end of the collimator/reflector combination which has an electro-optic layer and further has, on one side, first and second transparent electrodes covering areas located over a first pair of conjugate points of the lens, third and fourth transparent electrodes covering areas located over a second pair of conjugate points, and, on the opposite side, a third transparent electrode covering all four areas; c) a first approximately 50:50 fiber-optic coupler having two nominal input fibers and two nominal output fibers with one output fiber in optical contact with the first transparent electrode area and the other output fiber in optical contact with the third transparent electrode area; and d) a second approximately 50:50 fiber-optic coupler having two nominal input fibers and two nominal output fibers with one input fiber in optical contact with the second transparent electrode area and the other input fiber in optical contact with the fourth transparent electrode area. When, with respect to the third electrode, a different voltage is applied to the electrode covering the inner conjugate points compared to the voltage applied to the electrode covering the outer conjugate points, a difference in optical path length for light traveling in the associated pairs of fibers will result producing an optical phase difference. Because of interference effects, this will modulate the light transmitted to the output fibers of the second coupler in such a way that light from either of the two input fibers of the first coupler can be sent to either of the two output fibers. Selected voltages will cause full-on or full-off modulation resulting in two states: in one, the two inputs each go to particular fibers of the two outputs and, in the other state, each of the two inputs go to other outputs, i.e., they cross over in the second state and so a 2×2 crossbar switch is formed. A 2×N or 1×N switch can be obtained by concatenating a 2×2 switch with M additional stages of 2×2 switches until the desired value of N=2$^M$ is reached.

Another version uses two separate collimator/reflector combinations, one for each coupler and has the electro-optic layers located on the end opposite the input.

The invention also provides an alignment method for fiber-optic devices such as the crossbar switch disclosed herein which comprises micro-machining one or more V-groves in a silicon substrate using photolithography and an etch wherein the location and depth of the V-grooves is made with a precision of about 0.5 μm; adhering fiber-optic cables in the bottom of the V-grooves; cutting an end of the substrate containing the ends of the fibers and, if desirable, polishing the cut ends; placing the resulting substrate and fiber assembly in the vicinity of an input and/or an output of an optical device; monitoring a desired performance characteristic of the optical device, such as transmission from input fibers to output fibers; and adjusting the position of the assembly until the characteristic is optimized.

The switching speed is determined by the electro-optic material used for the electro-optic layers. For lead lanthanum zirconate titanate (PLZT), this can be in the nanosecond range.

It may be appreciated that there is no inherent loss mechanism. The loses should be primarily due to reflections at interfaces of which there are few. These can be minimized by using well known techniques should as anti-reflections coatings and/or index matching adhesives. The required components (at least in the preferred versions) are commercial available at reasonable cost and the processing involved is well known and not expensive. With the disclosed method, alignment is also fast.

DETAILED DESCRIPTION OF THE INVENTION

Figure 1A:
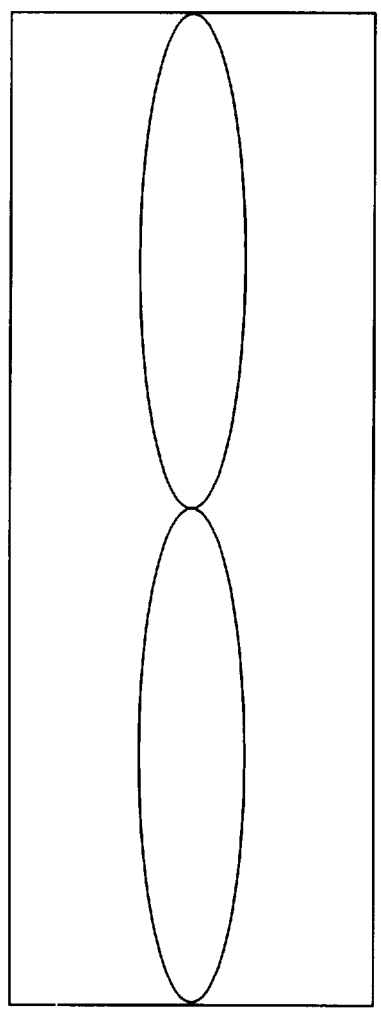
FIG. 1a illustrates one beat cycle in a GRIN fiber-optic cable.
Figure 1B:
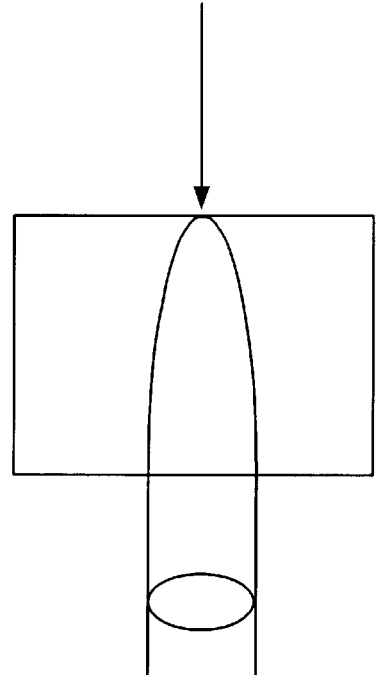
FIG. 1b illustrates an 0.25 pitch section of a GRIN fiber forming a lens
Figure 1C:
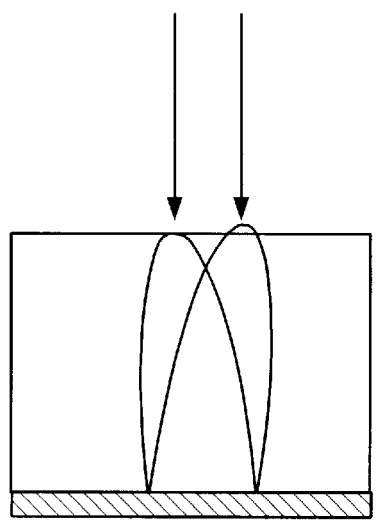
FIG. 1c illustrates conjugate points for off-axis light.

The invention makes use of two commercially available components, a GRIN lens and an optical coupler, and understanding the invention may be facilitated by a brief description of those. A GRIN (GRaded INdex) silica rod has an index of refraction, n, which decreases quadratically with distance from the center. This causes light rays which are not traveling down the central axis to bend to the center, cross over, and repeat in an undulating cyclical fashion down the fiber. FIG. 1a illustrates one "beat cycle". The remarkable aspect of GRIN fibers rods is that, due to the higher n in the center and the index grading, light traveling down the center has the same velocity as the undulating light and stays in phase with it over distances of kilometers. Moreover, if the GRIN rod is cut into one quarter of a beat cycle (termed an 0.25 pitch), a cylindrical lens is formed with a focal length of the same physical length. Parallel light entering either end will be focused on the other end. In the case of a fiber-optic cable in optical contact with one end, light rays from the cable enter the lens over a range of shallow angles, but reach the other end expanded and nearly parallel, i.e., collimated, as illustrated in FIG. 1b. Another aspect is that if light enters the one end (nominally an input end) displaced from the optical axis (ideally the mechanical central axis) and a mirror is placed in close proximity to the other (output) end of the lens, then, as illustrated in FIG. 1c, light will be reflected and refocused at the input end at a point equidistant from the lens optical axis as the point where it entered (termed the "conjugate point"). A GRIN lens is not the only way to perform the function of collimation light from a fiber, reflecting it, and refocusing it on a second fiber. However, it makes for a compact assembly and a convenient substrate for the additional elements in the invention.

An optical coupler functions to transfer light from one fiber-optic cable to another. The simplest, conceptually, is one where the cladding is stripped from the sides of two fibers and their cores are placed in contact. Light from one fiber will leak into the other. Using this and other methods, it is possible to make couplers with controlled coupling coefficients. The most common is the 50:50 coupler wherein half the light from any one fiber will be coupled into the other. For many applications, it is important to note that when light from one fiber is transmitted to another, it will undergo a 90° phase lag. This means, for example, if the light is transmitted through a second coupler it will acquire another 90° of phase lag and so if it is combined with the light in the original source fiber, destructive interference will occur.

Understanding the invention also requires an appreciation of a well known effect of light traveling through matter. Assuming a flat plate of thickness D and index of refraction n, on entering the plate, the velocity of the light and its wavelength λ will be reduced by 1/n. On exiting the plate, the waves will have gone through nD/λ cycles. Unless this quantity is an integer, N, i.e., nD=Nλ, the waves coming out will lag in phase by an amount θ(deg)=360×(nD/λ modulo N). If the exiting light is combined with a portion of the entering light, the waves will interfere constructively or destructively depending on θ. Thus, if the quantity, nD, termed the optical path length, φ, can be controlled, devices can be made which modulate the intensity.

This invention utilizes electro-optic materials which change φ in response to an externally applied voltage. φ can be altered by changing D, n, or both. For a material with an applied voltage, V, one can write Δφ=nΔD+DΔn=nγV$^2$/D−0.5n$^3$RV$^2$/D+ndV−0.5n$^3$rV     Equation 1:

The four terms on the right represent the electrostrictive, quadratic electro-optic (Kerr), piezoelectric, and linear electro-optic (Pockell's) effects with coefficients γ, R, d and r, respectively. All materials exhibit the first two effects which depend quadratically on V to a greater or lesser extent. There also exist 20 classes of piezoelectric crystals with no center of symmetry which also exhibit the later two effects which depend linearly on V. Note that, for ferroelectric and possibly other materials, the R coefficient is negative so that the first two effects are additive. Also, d and r may be positive or negative, but they have opposite signs in some materials so that the later two effects add to each other also.

The four coefficients are in general complex tensors taking into account absorption and the direction of the externally caused electric field in the material with respect to the direction of propagation of the light. However, the invention can be understood by assuming no absorption and ignoring the field and light directions. In the embodiment illustrated herein, the applied electric field will be parallel to the light, but some materials have non-zero coefficients when the electric field is perpendicular. The invention merely requires that an effect exists, i.e., $\phi$ changes when a voltage is applied, no matter what the mechanism.

Material selection involves, among other considerations, selecting those with the highest combination of coefficients. As examples of useful electro-optic materials, lithium niobate has been used often in fiber-optic devices because it exhibits linear electro-optic effects with reasonable values of d and r. This may be useful for making a linear phase modulator. However, in making a switch, linearity is not a requirement but voltage sensitivity is. Lead lanthanum zirconate titanate (PLZT), depending on the composition, exhibits both linear and quadratic effects. The composition $Pb_xLa_{(1-x)}(Zr_yTi_z)_{(1-x/4)}$ (x=9, y=65, z=35) does not exhibit the linear effects (d=r=0) but has high quadratic coefficients, $\gamma$ and R, which reduces the voltage requirements. Also, the electro-optic response time of a typical oxide electro-optic material, such as PLZT. is in the sub-nanosecond range, C. Bao, et al., CLEO '95, Baltimore, Md., May 21–26, 1995.

Figure 2:
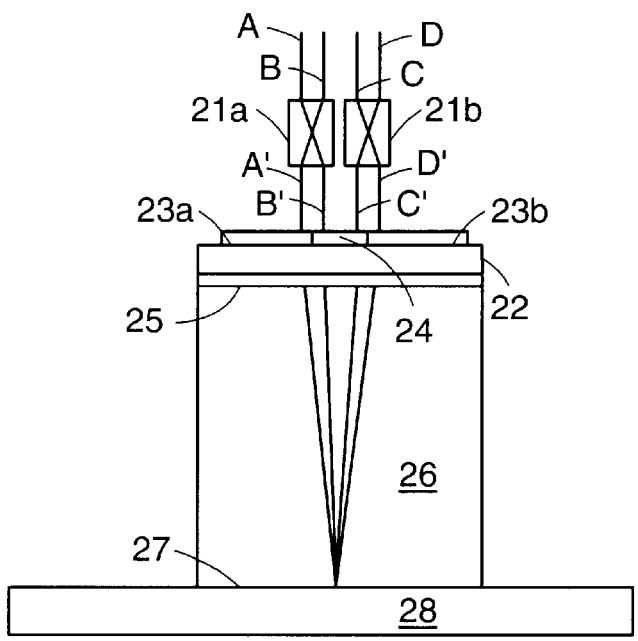
FIG. 2 illustrates a 2×2 electro-optic fiber-optic crossbar switch.

FIG. 2 illustrates one embodiment of the invention showing two input fibers A and B passing through a 50:50 coupler 21a and two output fibers C and D passing through a second 50:50 coupler 21b. All four fibers are in optical contact with an electro-optic layer 22 with transparent electrodes 13a, 23b, 24, and 25 on either side. The electro-optic layer is in optical contact with a GRIN lens 26 on one of its ends while a mirror reflecting surface 27 is in optical contact with the other end of the lens. The mounting base 28 is convenient but not essential. The output fibers are placed at conjugate points so that light from corresponding input fibers that is collimated by the lens is reflected from the mirror and refocused by the lens at the output fibers. This requires cutting the GRIN lens slightly short of an 0.25 pitch to allow for the optical thickness of the electro-optic layer. (Note that the GRIN lens could be lengthened in increments of 0.5 pitch with equivalent effect.) On applying a voltage to the electro-optic layer, light from the two input fibers will each be switched to alternate output fibers. In other words, in one state, the connections A:C and B:D will be made, which by convention is the cross state, while in the other state, conventionally called the bar state, the connections A:D and B:C will be made.

This can be understood by first considering the light from input fiber A in the cross state. It will be assumed that $\phi$, from the output of the input coupler to the input of the output coupler is an integer multiple of $\lambda$ and thus $\theta=0°$. On passing through the input coupler, half the light is transmitted in A' (the continuation of the fiber A) and half the light is transmitted to B' with the coupler's usual 90° phase lag ($\theta=-90°$). The light from A' travels to D' and the light from B' travels to C'. On entering the output coupler, half the light in D' travels to D with no additional phase lag and half is transmitted to C with a 90° phase lag. Meanwhile, the light from C', which has the 90° phase lag acquired in the input coupler is half transmitted into C and half into D with an additional 90° of phase lag. The light in D now consists of two equal components which are 180° out of phase and so cancel. The light in C now consists of two components which have the same 90° phase lag and so add constructively. Similar reasoning shows that the light from B travels to D so that the cross state, A:C−B:D is produced.

When a voltage is applied to the electro-optic layer 22, $\theta$, the optical phase will change. A voltage between the top outer electrode segments 23a and 23b (which can be connected externally, if convenient) and the reference electrode 25 will change the phase over the path from fiber A' to fiber D' and, similarly, a voltage between the top inner segment 24 and the reference electrode 25 will change the phase over the path from fiber B' to C'. Assuming that with no voltage the optical phase was 0°, then it can be shown that the output of C and D only depends on the phase difference, $\theta$, over their two different paths and Equation 2:
$$C=A((1+\cos\theta)/2)^{1/2}+B((1-\cos\theta)/2)^{1/2}$$
$$D=A((1-\cos\theta)/2)^{1/2}+B((1+\cos\theta)/2)^{1/2}$$

When $\theta=0°$, D=B and C=A (cross state) and when $\theta=180°$, C=B and D=A (bar state) where now A, B, C, and D represent the optical intensities in the respective fibers.

In practice, with no voltage applied, $\theta$ will not be 0° because this would require that optical path lengths are matched to a small fraction of a $\mu$m. However, a voltage on one of the top segments, e.g., segment 24, can be applied to adjust one of the paths to match the other. The other segment can then be used to produce the 180° phase lag for switching. It should be noted that if there were an electrode underjust one of the fibers, e.g., 23a under A', and no electrodes or electro-optic phase retarder under any of the other fibers, the switch would function in the same way with the same result. A DC bias could be applied to the single electrode 23a to adjust the optical path length for the cross state. However, the results would be poorer. Any voltage required to switch would be in addition to the DC bias, increasing voltage source requirements, and all phase retardation would have to come from one pass through the electro-optic material, further increasing voltage requirements. For the later reason, use of electrode 23b under fiber D' is beneficial. For the former reason use of 24 is beneficial. A further benefit of using 24 with its associated electro-optic material is that, if the electro-optic material is the same and in thermal contact, changes due to temperature should be matched for both pairs of conjugate points resulting in no change in relative phase difference and, therefore, no change in the output. Another option is to retain more degrees of freedom by using a separate electrode corresponding to each fiber, i.e., in this embodiment, splitting 24 and not connection 23a and 23b. This could be used to compensate for non-uniformities in the electro-optic layer.

Note, also, that the C and D fibers could have as well been the inputs and the A and B fibers the outputs. Further, the device can operate as a modulator by supplying voltages which produce values of $\theta$ which are other than 0° or 180°. With quadratic PLZT, it may be useful to sense one or more of the outputs and employ feedback in order to linearize the voltage response. The sensing means would be a photodetector and there are numerous means well known in the electrical arts for producing a suitable feedback loop.

A prototype working example with the structure of FIG. 2 was constructed as follows: A commercially available 1.8 mm diameter GRIN lens (Nippon Sheet Glass model SLW 1823-NC130 sold under the trademark SELFOC) with a pitch of 0.23 (4.383 mm long) for use at $\lambda=1.3$ $\mu$m was selected. The 0.23 pitch length combined with the thickness of an electro-optic layer would produced the desired 0.25 pitch lens. Next, a silicon wafer was coated with gold to form a mirror and attached to the bottom of the lens (taking the place of the base 28 of FIG. 2) with a standard UV curing index matching (index of refraction, n=1.51) adhesive commonly used in fiber-optic applications.

A commercially available (Aura Ceramics, New Hope, Minn.) hot pressed ceramic PLZT plate with a 9:65:35 composition and a thickness of 250 µm was selected. The plate was cut to approximately 8 mm×15 mm and transparent conducting electrodes of indium/tin oxide (ITO), 500 nm thick, were evaporated on the bottom to form a reference electrode and the top to form the inner and outer segment electrodes. Electrode wires were attached by wedge bonding to metal contacts deposited on the ITO electrodes. The plate was mounted in a jig and the GRIN lens/gold mirror assembly was attached to the bottom ITO electrode of the PLZT plate with the index matching adhesive.

Commercially available 50:50 2×2 fiber-optic couplers (Thomas & Betts model SMC315-02A1S1) were selected. These had a tolerance of 5% on the coupling ratio (i.e., they could be as bad as 45:55) and an insertion loss (as defined for use in the present switch) of about 0.5 db. Couplers with worse tolerances would still work but the on- and off-state transmissions would be even less ideal, i.e., not 100% and 0% respectively.

Individually aligning the four fibers from the two couplers and making optical contact to the top electrode segments could be tedious. To solve this problem, a non-standard approach was taken. Using well known photo-lithographic and potassium hydroxide (KOH) etching techniques, four V-grooves were etched into a silicon wafer spaced 250 µm apart with a tolerance of about 0.5 µm. The silicon wafer was cut to form an approximately 13 mm by 50 mm plate. (See FIG. 6 for an eight V-groove example discussed below.) The four fibers from the two couplers were press fit into the V-groves, with their free ends extending off the silicon plate, and secured with adhesive. A diamond saw was used to cut about 5 mm off the plate on the side next to the free ends of the fibers. The surface containing the silicon and the cut ends of the fibers was not polished. The bottom of the silicon plate was then attached to a metal plate which was in turn attached to a three axis X-Y-Z mechanical stage.

The silicon plate was then lowered down to the PLZT plate. Before making contact, a standard index matching gel was placed between the PLZT plate and the fibers. (In production, a UV-curing adhesive would be used.) Alignment was accomplished by transmitting 1.3 µm laser light through the two input fibers and monitoring the output fibers with photo diodes. The X, Y, and Z positions were adjusted to maximize the outputs. Application of a voltage between the inner segment and reference electrode produced the bar state.

Figure 3:
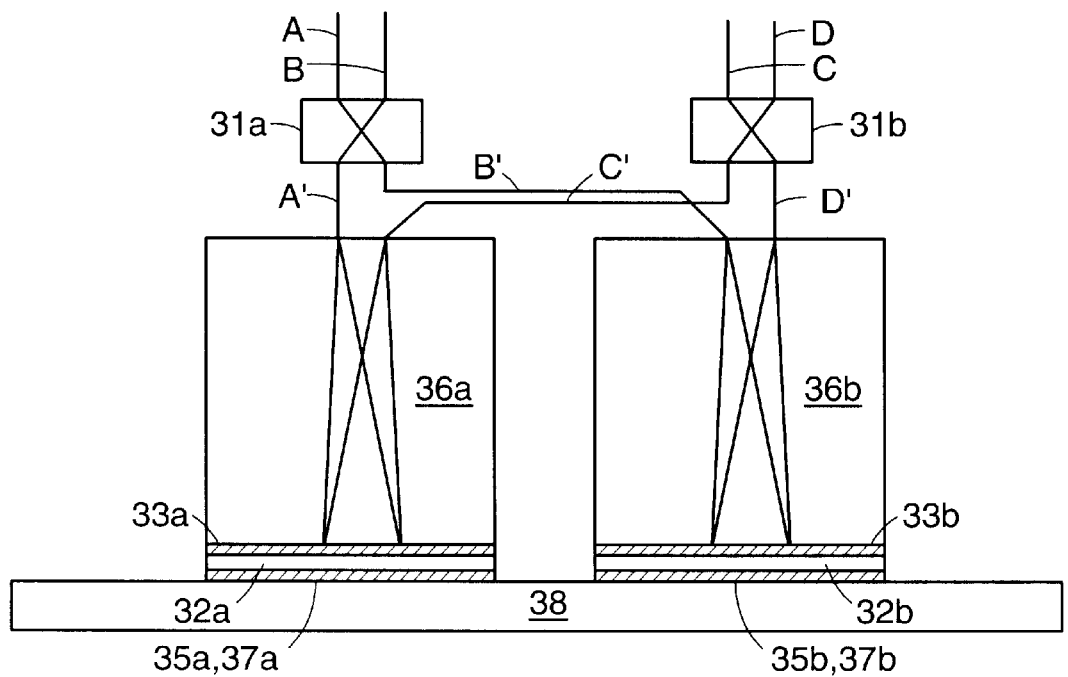
FIG. 3 illustrates a version of FIG. 2 using two GRIN lenses.

FIG. 3 illustrates the same device using two GRIN lenses with the electro-optic material on the bottom of the lenses. The figure shows elements 31a, 31b corresponding to the couplers 21a and 21b of FIG. 2. However, instead of an inner and outer electrode pair, the fibers B' and D' go to separate lenses having separate phase retarders with electro-optic layers 32b and 32a, top electrodes 33b and 33a, separate bottom electrodes 35b and 35a, and separate reflectors 37b and 37a, respectively on base 38. The function of bottom electrode and mirror could be combined in one using, e.g., a conductive, reflective metal film. This has the disadvantage that the area of the electro-optic layer must cover the collimated, i.e., expanded beams and so the additional capacitance will reduce the speed. However, it has the advantage that two fibers at a time are easier to align than four.

It should be noted that the electro-optic layer is not restricted to ceramic plates. It is possible to produce PLZT thin films on a suitable transparent substrate, Higashino et al, *High Speed Optical TIR Switches Using PLZT Thin-Film Waveguides on Sapphire*, Jap. J. Appl. Phys., vol. 24, Supp. 24-2, pp. 284–286 (1985), incorporated herein by reference. Alternately, PLZT thick films have been made, K. K. Li et al, *An Automatic Dip Coating Process for Dielectric Thin and Thick Films*, Integrated Ferroelectrics, vol 3, pp. 81–91 (1993), incorporated herein by reference. Besides PLZT, a number of other materials are well known to have usefully high electro-optic coefficients. However, PLZT is preferred because it should be among the lowest in required operating voltage and be less expensive. Also, the electro-optic response time of a typical oxide electro-optic material, such as PLZT, is in the sub-nanosecond range, C. Bao, et al., CLEO '95, Baltimore, Md., May 21–26, 1995, incorporated herein by reference.

Figure 4:
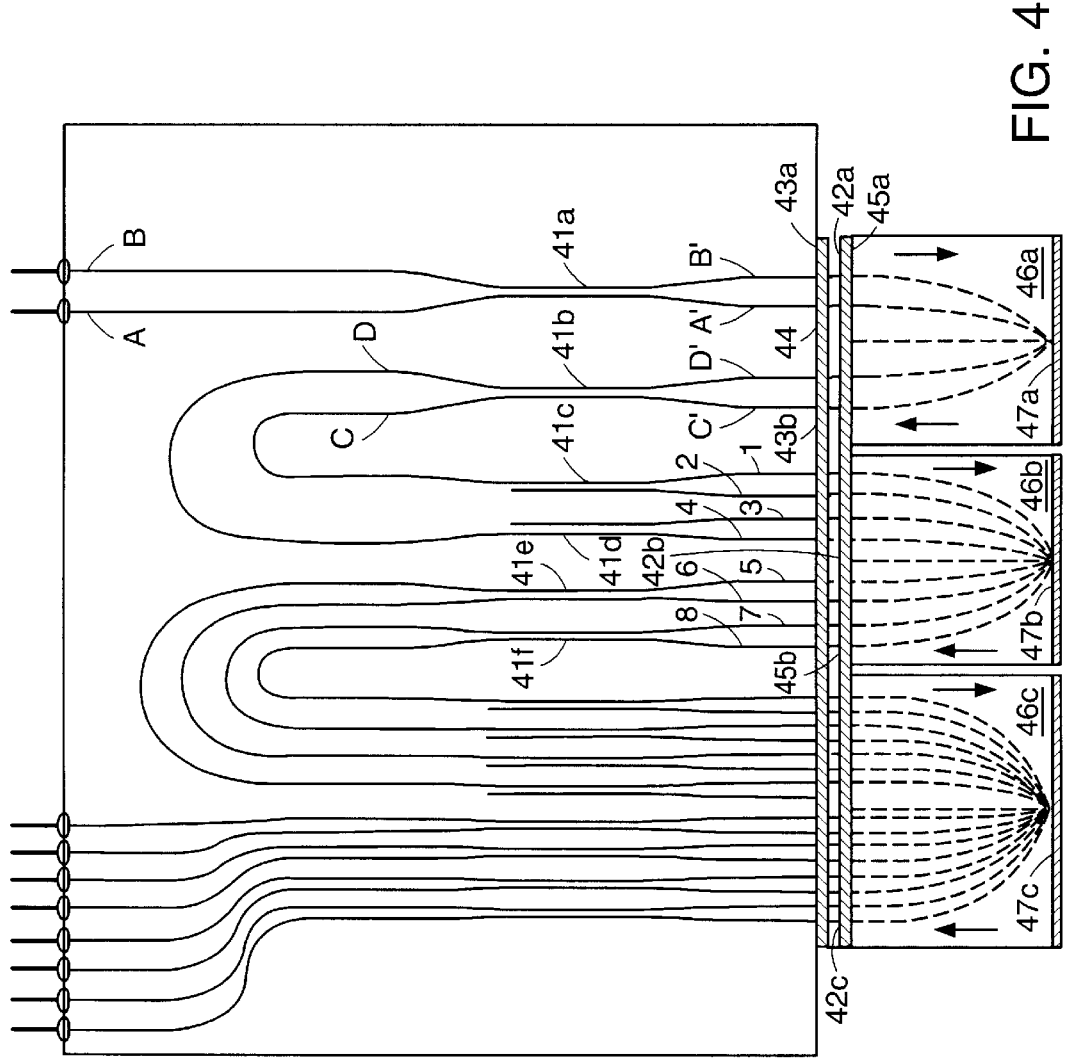
FIG. 4. illustrates V-grooves micro machined in a silicon substrate.

The invention is not limited to only 2×2 switches. For example a 2×8 switch can be constructed as illustrated in FIG. 4. In this configuration, a 2×2 switch, similar to the one shown in FIG. 2, is shown on the right, with reference characters, 41a, 41b, 42, 43a, 43b, 44, 45a, 46a, and 47a corresponding to similar 2× characters in FIG. 2. It should be understood that there are separations between 43a, 44, and 43b. The electro-optic phase retarder could be a single sheet as shown, but most likely would be separate layers as indicated by the reference characters, 42a, 42b, and 42c. Also, the designation of inner and outer fibers has been switched, but this doesn't affect the following. After the first stage, the outputs C and D are each fed into two more couplers in the second stage, 41c and 41d which, however, have dummy inputs. That is, no light is fed into the other inputs of the couplers to which the C and D fibers are connected. The middle GRIN lens 46b with reflector 47b, bottom electrode 45b, and phase retarder 42b has two 2×2 switches comprised of an inner one with the D fiber as a single input and the two outputs next most adjacent from the coupler 41e and an outer one with the C fiber as a single input and two outputs opposite from the coupler 41f, i.e., on the opposite periphery of the GRIN lens 47b. For the fibers 1 trough 8 going from right to left in the figure (or left to right since it is symmetrical), with corresponding top electrodes (not referenced to characters) under each fiber, the following pairs would have electrodes, covering the phase retarder 42b, connected: 4–5 and 3–6 forming the inner 2×2 switch and 2–7 and 1–8 forming the outer 2×2 switches. In a similar manner, the leftmost GRIN lens 46c in the third stage has eight couplers and four 2×2 switches comprised of the corresponding couplers and fiber pairs symmetrically disposed about its optical axis. Except for losses, there is no limit to how many stages can be used. It is not necessary that all of one stage fit on one GRIN lens, since the cables can be routed to two or more. Thus, what has been described is a 2×N switch. Nominally, N is 2 to a power (given by the number of stages), but coupler outputs can be unused so that N can be any number. Also, one of the input fibers A or B could be unused to make a 1×N switch.

Note that, one could make the top electrodes with ITO thin films connecting the various pairs. However, capacitance would be reduced and speed increased if only so much electrode area as necessary to cover the light beams were used and connections made with wires. Under each of the fibers 1 through 8, would be a small area dot with a protrusion for wire bonding. This area is bigger than the nominal 10 µm core because of beam divergence, the need to provide uniform electric fields, and the limitations of wire bonding, but less than making connections with ITO running from fiber to fiber.

Figure 5:
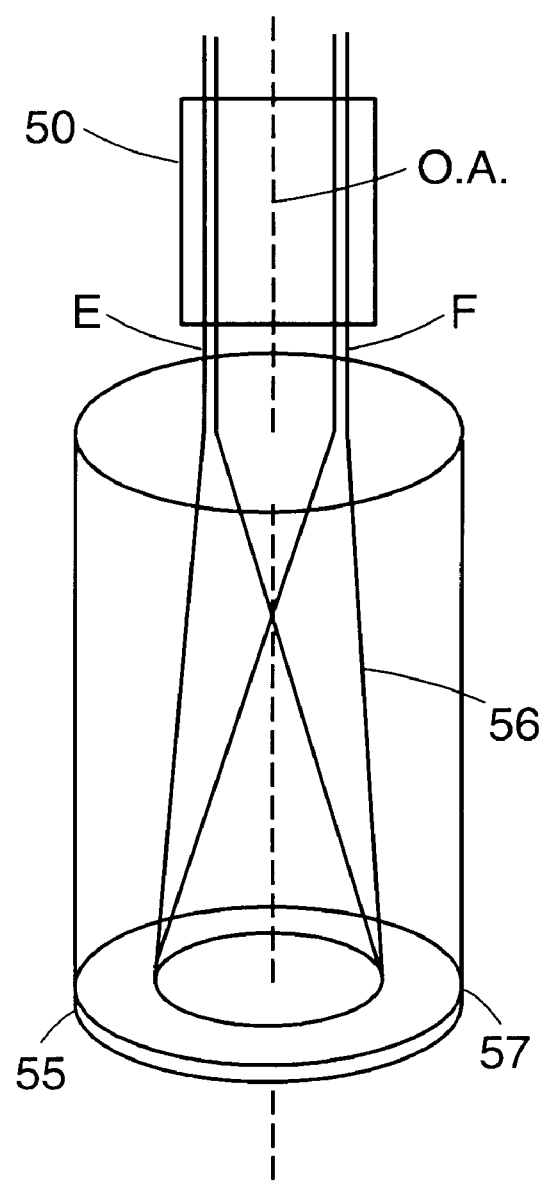
FIG. 5 illustrates a general alignment method using the V-groove substrate.

FIG. 5 illustrates a different application with two fibers E and F set in a mounting block 50 with a GRIN lens 56 having some sort of optical element 55 with a reflector 57. When only two fibers are involved, even if not precisely separated, it is always possible to move the block 50 left and right in the drawing to them symmetrical with respect to the GRIN lens optical axis (O.A.). These two will then be at conjugate points. However, this exhausts the degrees of freedom. If two more fibers are added as in the switch illustrated in FIG. 2, the placement of those must be precise with respect to the two used for alignment.

In the 2×2 crossbar switch, low insertion loss requires that the four fibers are aligned within about 1 µm radially and that their axes are within about 1° of each other. Moreover, the optical axis for the two sets of conjugate points must coincide with the optical axis of the GRIN lens to the same radial tolerance, i.e., the GRIN lens may not be ideal. Moreover, since the physical axis of the GRIN lens doesn't necessarily coincide with its optical axis, mechanical registration to the GRIN lens may not be adequate.

Figure 6:
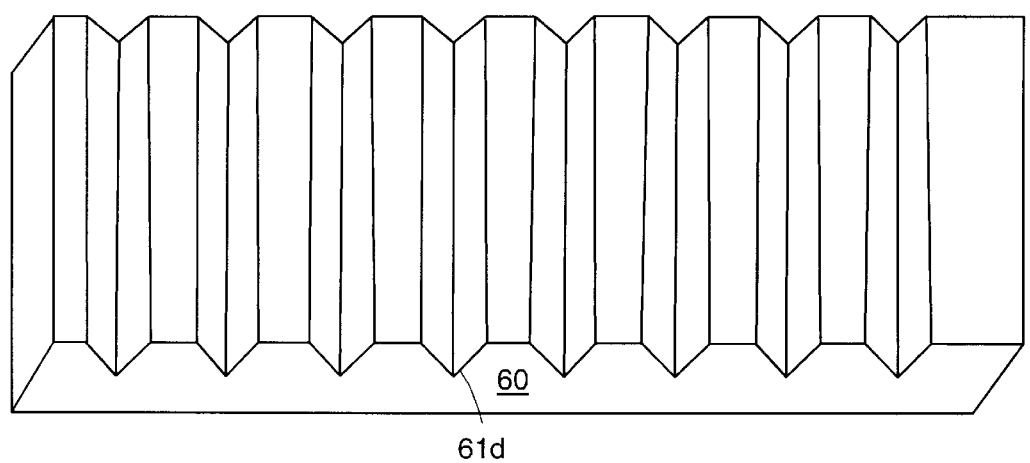
FIG. 6 illustrates a 2×N switch where N=8.

Assuming that at least the optical axes for all pairs of conjugate points coincide with each other, a solution is to fix the fibers with respect to each other using the silicon plate with V-grooves as described previously for the 2×2 switch and illustrated in more detail in FIG. 6 for an eight fiber application showing a silicon block 60 with a typical V-groove 61d. Then, as noted above, alignment is simply a matter of optimizing the output form one or some average of all output fibers by moving the silicon-fiber assembly.

While the preferred embodiments have been sufficiently described to enable one skilled in the art to make and use them, it should be appreciated that other obvious alternatives, modifications, or substantial equivalents will be apparent to those in the field of electro-optics, which equivalents are intended to be include herein, the only limitations being the claims.

What is claimed is:

1. An optical crossbar switch or modulator device comprising:
    a combination collimating lens and reflector selected to collimate light entering from fiber-optic cables at an input end and refocus it on fiber optic cables located at conjugate points at said input end;
    a voltage-controlled electro-optic phase retarder in optical contact with said input end of said collimator/reflector combination comprised of an electro-optic layer further having on one side first and second transparent electrodes covering areas located over a first pair of conjugate points of said lens, third and fourth transparent electrodes covering areas located over a second pair of conjugate points, and, on the opposite side, a third transparent electrode covering all four areas;
    a first approximately 50:50 fiber-optic coupler having two nominal input fibers and two nominal output fibers having one output fiber in optical contact with said first transparent electrode area and the other output fiber in optical contact with said third transparent electrode area; and
    a second approximately 50:50 fiber-optic coupler having two nominal input fibers and two nominal output fibers having one input fiber in optical contact with said second transparent electrode area and the other input fiber in optical contact with said fourth transparent electrode area.

2. The device of claim 1 wherein said electro-optic layer of said phase retarder is comprised of a solid state material selected to provide a change in optical path length in a direction normal to said layer when a voltage is applied.

3. The device of claim 2 wherein said electro-optic layer is comprised of an oxide.

4. The device of claim 3 wherein said oxide is PLZT.

5. The device of claim 4 wherein said PLZT has the composition $Pb_xLa_{(1-x)}(Zr_yTi_z)_{(1-x/4)}$ and x=9, y=35, and x=65.

6. The device of claim 4 wherein said PLZT is in the form of a hot pressed ceramic plate.

7. The device of claim 4 wherein said PLZT is a deposited film.

8. The device of claim 1 wherein said collimator/reflector combination comprises a GRIN lens having a selected pitch and a reflector in optical contact with an end of said GRIN lens distal to said input end.

9. The device of claim 8 wherein said reflector comprises an evaporated gold film.

10. The device of claim 1 further comprising a block having precisely spaced V-grooves for fixing the position of said output fibers of said first coupler and said input fibers of said second coupler so that alignment is made easier.

11. The device of claim 1 wherein said collimator/reflector combination comprises a GRIN lens having a selected pitch and a mirror on one end and said electro-optic layer is a hot-pressed PLZT ceramic plate.

12. The device of claim 11 further comprising a block having precisely spaced V-grooves for fixing the position of said output fibers of said first coupler and said input fibers of said second coupler so that alignment is made easier.

13. The device of claim 1 further comprising means for detecting the amplitude of light transmitted to at least one out put fiber and means for controlling the voltage on the voltage controlled electro-optic phase retarder so that the output light is a linear function of control voltage.

14. An optical crossbar switch or modulator device comprising:
    a first collimating lens selected to collimate light entering an input end at a first conjugate point and refocus reflection from an output end at the second conjugate point at said input end and further having disposed adjacent said output end a first reflecting voltage-controlled electro-optic phase retarder in optical contact with said output end comprised of an electro-optic layer having transparent electrodes with sufficient area to cover a collimated beam and a reflector adjacent and said transparent electrode opposite said collimating lens;
    a second collimating lens selected to collimate light entering an input end at a first conjugate point and refocus reflection from an output end at the second conjugate point at said input end and further having disposed adjacent said output end a first reflecting voltage-controlled electro-optic phase retarder in optical contact with said output end comprised of an electro-optic layer having transparent electrodes with sufficient area to cover a collimated beam and a reflector adjacent and said transparent electrode opposite said collimating lens;
    a first approximately 50:50 fiber-optic coupler having two nominal input fibers and two nominal output fibers having one output fiber in optical contact with said first collimating lens and the other output fiber in optical contact with said second collimating lens; and
    a second approximately 50:50 fiber-optic coupler having two nominal input fibers and two nominal output fibers having one input fiber in optical contact with said first collimating lens at a point conjugate to said fiber of said first coupler and a one input fiber in optical contact with said second collimation lens at a point conjugate to said fiber of said first coupler.

15. The device of claim 14 wherein said electro-optic layers of said phase retarders are comprised of a solid state material selected to provide a change in optical path length in a direction normal to said layers when voltages are applied.

16. The device of claim 15 wherein said electro-optic layers are comprised of oxides.

17. The device of claim 16 wherein said oxide is PLZT.

18. The device of claim 17 wherein said PLZT has the composition $Pb_xLa_{(1-x)}(Zr_yTi_z)_{(1-x/4)}$ where x=9, y=35, and x=65.

19. The device of claim 17 wherein said PLZT is in the form of a hot pressed ceramic plate.

20. The device of claim 17 wherein said PLZT is a deposited film.

21. The device of claim 14 wherein said collimator/reflector combination comprises a GRIN lens having a selected pitch and a reflector on one end.

22. The device of claim 20 wherein said reflector comprises an evaporated gold film in optical contact with an end of said GRIN lens distal to said input end.

23. The device of claim 14 further comprising a block having precisely spaced V-grooves for fixing the position of said output fibers of said first coupler and said input fibers of said second coupler so that alignment is made easier.

24. The device of claim 14 wherein said collimator/reflector combination comprises a GRIN lens having a selected pitch and a mirror on one end and said electro-optic layer is a hot-pressed PLZT ceramic plate.

25. The device of claim 23 further comprising a block having precisely spaced V-grooves for fixing the position of said output fibers of said first coupler and said input fibers of said second coupler so that alignment is made easier.

26. The device of claim 14 further comprising means for detecting the amplitude of light transmitted to at least one output fiber and means for controlling the voltage on the voltage controlled electro-optic phase retarder so that the output light is a linear function of control voltage.

27. A 2×N switch or modulator comprised of the device of claim 1 as a first stage wherein each of the two outputs of a said first stage feeds a separate input of two following 2×2 switches or modulators forming a second stage, the four outputs of those in turn each feeding an input of four following 2×2 switches or modulators forming a third stage, the number of stages selected to produce a desired value of N.

28. The device of claim 27 wherein said electro-optic layers of said phase retarders are comprised of a solid state material selected to provide a change in optical path length in a direction normal to said layers when voltages are applied.

29. The device of claim 28 further comprising a block having precisely spaced V-grooves for fixing the position of said output fibers of said first coupler and said input fibers of said second coupler so that alignment is made easier.

30. The device of claim 27 wherein one input of said first stage is unilluminated whereby a 1×N switch or modulator is obtained.

31. A method of switching optical signals from two input fiber-optic cables to two output fiber optic cables comprising the steps of:
   a) cross-coupling signals from the two input fibers using a first optical cross coupler having two outputs;
   b) passing the light from at least one of the two outputs of said first optical coupler through a voltage controlled optical phase retarder;
   c) collimating and reflecting the light emerging form said at least one phase retarder and any remaining outputs from said first optical coupler; and
   d) refocusing the collimated and reflected light onto the inputs of a second optical coupler having two output fibers.

32. The method of claim 31 wherein said at least one phase retarder is comprised of PLZT.

33. The method of claim 32 wherein said PLZT is in the form of a hot-pressed ceramic plate.

\* \* \* \* \*